United States Patent [19]

Hackmyer

[11] 4,265,721

[45] May 5, 1981

[54] COMMERCIAL HYDROGEN GAS PRODUCTION BY ELECTROLYSIS OF WATER WHILE BEING SUBJECTED TO MICROWAVE ENERGY

[76] Inventor: Saul A. Hackmyer, 2335 N.E. 172nd St., North Miami Beach, Fla. 33160

[21] Appl. No.: 147,060

[22] Filed: May 5, 1980

[51] Int. Cl.³ .............................................. C25B 1/04
[52] U.S. Cl. .................................................... 204/129
[58] Field of Search ......................................... 204/129

[56] References Cited

U.S. PATENT DOCUMENTS

| | | | |
|---|---|---|---|
| 3,954,592 | 5/1976 | Horvath | 204/129 |
| 4,107,008 | 8/1978 | Horvath | 204/129 |
| 4,184,931 | 1/1980 | Inoue | 204/129 |

*Primary Examiner*—Howard S. Williams

[57] ABSTRACT

Water is electrolytically decomposed in a microwave-fed resonant cavity whereby electrolysis is so greatly enhanced as to make the commercial production of hydrogen and oxygen gasses a practicality.

2 Claims, No Drawings

COMMERCIAL HYDROGEN GAS PRODUCTION BY ELECTROLYSIS OF WATER WHILE BEING SUBJECTED TO MICROWAVE ENERGY

BACKGROUND OF THE INVENTION

The fact that water can be decomposed into its hydrogen and oxygen elements by electrolysis has been known for many decades. Heretofore, however, commercial process has been so costly as to be impractical for the production of these gasses for widespread commercial use. At the same time, because of the dwindling supply and the increasing cost of convential sources of energy, such as fossil fuels and natural gas, alternative sources of energy for fueling automotive vehicles, for example, are currently being actively sought. The use of liquified hydrogen gas as such an alternative fuel has a distinct advantage in that it is substantially non-polluting. Up until now, however, the cost of commercially producing hydrogen gas by electrolysis has been prohibitive.

It is, accordingly, the principal object of this invention to provide an improved method and means for the electrolysis of water which so enhances the electrolytic process as to enable production of hydrogen gas so economically as to be practicable on a heretofore unknown commercial scale.

A more particular object of my invention is to provide an electroysis method of the above nature wherein the electrolytic fluid container is disposed within a resonant cavity or chamber fed by microwave energy, whereby such intense agitation of the electrolyte molecules is effected as tremendously increases electron vibration between the electrical poles, as a consequence of which hydrogen gas, as well as oxygen, will be given off at high rates and in such large quantitities as heretofore not achievable.

Other objects, features and advantages of the invention will be apparent from the following discription.

DETAILED DESCRIPTION OF THE PREFERRED EMBODIMENT

In accordance with the invention, microwave energy produced by a microwave generator will be fed to a resonant cavity of such size as will contain one or more electrolytic cells comprising a synthetic plastic material, glass or other non-energy absorbing containers holding the water to be electrolyzed. Microwave energy at a frequency of 915 Mh (allocated for industrial use by governmental authority) is considered to be particularly effective in my method. Suitable amounts of salt may be added to the water of the electrolyte to produce the conductive negative ions. Gas passage conduits surrounding the electrolytic poles with their lower ends immersed in the electrolyte, will collect the electrolytically released gasses for flow into respective gas collecting tanks. The gas so collected in the tanks may then be liquified by compression for convenient commercial use. It will be understood that my method for the commercial production of hydrogen gas also results in the production in commercial quantities (approximately ½ the amount by volume) of oxygen gas. Therefore, the hydrogen and oxygen gasses can be electrolytically produced in a portable microwave resonant chamber apparatus that can be installed in a vehicle for directly supplying hydrogen and oxygen for combustion in the combustion chambers of the vehicle engine.

While I have described herein only the basic mehtod by means of which hydrogen and oxygen gas can be produced commercially by electrolysis in a microwave resonant cavity or chamber, it is to be understood that the method described and claimed herein is presented as illustrative, only and not in a limiting sense. The invention, in brief, comprises all the methods and embodiments coming within the scope and spirit in the following claims.

What is claimed as new and for which it is desired to secure Letters Patent is:

1. The method of commercially producing hydrogen and oxygen gases electrolytically from an aqueous electrolyte which comprises, placing an electrolytic cell within a resonant chamber, then feeding resonating microwave energy to said resonant chamber for subjecting the molecules of the electrolyte to vibration at the microwave energy frequency, and then collecting the hydrogen and oxygen gasses released at the two poles of the electrolytic cell.

2. The method as defined in claim 1 wherein said resonating frequency is 915 Mh.

* * * * *